United States Patent Office 2,918,510
Patented Dec. 22, 1959

2,918,510

PROCESS FOR ISOMERIZING SATURATED HYDROCARBONS

Norman L. Carr, Crystal Lake, Vincent Brozowski, Mundelein, and Oral L. Beber, Crystal Lake, Ill., assignors to The Pure Oil Company, Chicago, Ill., a corporation of Ohio No Drawing. Application November 14, 1957
Serial No. 696,319

9 Claims. (Cl. 260—683.65)

This invention relates to the isomerization of saturated isomerizable hydrocarbons having 4–7 carbon atoms per molecule. It is more specifically concerned with promoting the efficiency of a hydroisomerization process carried out in the presence of a catalyst consisting essentially of a refractory oxide catalyst, composited to evince acidic properties and hydrocarbon cracking activity, and promoted with a nickel containing-hydrogenation agent.

According to this invention, the hydroisomerization efficiency of an isomerization catalyst consisting essentially of a refractory oxide catalyst, composited to evince acidic properties and hydrocarbon cracking activity, and copromoted with metallic nickel and an oxide of a metal, is enhanced by carrying out the isomerization of saturated isomerizable hydrocarbons having 4–7 carbon atoms per molecule in the presence of added amounts of water.

Although isomerization of hydrocarbons is a well-known reaction, its importance as a unit process in an integrated refining scheme for the production of high-octane-number blending stocks for use in the formulation of gasolines has become more important due to the increased need of motor fuels for use in high-speed, high-output, spark-ignited, internal combustion engines. The isomerization reaction is a reversible reaction which, if carried out in the absence of a catalyst, has a low efficiency; therefore, the promotional effect of a variety of solid isomerization catalysts has been investigated.

Satisfactory catalysts for use in the hydroisomerization of saturated isomerizable hydrocarbons include refractory oxide catalysts which have been composited to evince acidic properties and hydrocarbon cracking activity, and are promoted with small amounts of various hydrogenation agents. Nickel-containing hydrogenation agents have been found to enhance the isomerization activity of these composite catalysts. The effective use of such catalysts, however, is affected by their hydrocracking propensities, which deleteriously influence the isomerization selectivity. It has now been found that if the hydrosomerization process is carried out in the presence of added amounts of water, this manipulative expedient produces a selective action which enhances the efficiency of several nickel-promoted catalysts of this type for promoting the hydroisomerization of saturated, isomerizable hydrocarbons having 4–7 carbon atoms per molecule.

It is, therefore, the primary object of this invention to improve the rate and efficiency of the isomerization of saturated isomerizable hydrocarbons having 4–7 carbon atoms per molecule employing a refractory oxide catalyst composited to evince hydrocarbon cracking activity and acidic properties and promoted with nickel. These and other objects will become more apparent from the following detailed description of this invention.

By employing a composite hydroisomerization catalyst consisting essentially of refractory oxide catalysts composited to evince acidic properties and hydrocarbon cracking activity, co-promoted with a metallic nickel and an oxide of a metal of Group VI–A, e.g., chromia, molybdenum, and tungsten oxide, for the isomerization of isomerizable, saturated hydrocarbons having 4–7 carbon atoms per molecule at a temperature within the range of about 600°–750° F., a pressure within the range of about atmospheric—1000 p.s.i.a., a liquid hourly volume space velocity within the range of about 0.1–2.0, and a hydrogen/hydrocarbon mol ratio within the range of about 0.5–4.5, hydrocarbon cracking activity is substantially reduced and the efficiency of the hydroisomerization reaction increased by introducing into the reaction zone sufficient amounts of water to provide a partial pressure of water within the range of about 10 to 50 millimeters of mercury.

Catalysts which are susceptible to the selective effect of added amounts of water introduced into the hydroisomerization reaction zone include composite catalysts consisting essentially of a refractory oxide catalyst base composited to evince acidic properties and hydrocarbon cracking activity, having incorporated therein a small amount of metallic nickel and an oxide of a Group VI–A metal. Specific examples of the refractory oxides catalyst base include but are not limited to hydrocarbon cracking catalysts, such as silica-alumina, silica-zirconia, silica-titania, silica-boria, alumina-zirconia, alumina-beryllia, alumina-boria, silica-chromia, boria-titania, silica - alumina - zirconia, silica - alumina - beryllia, acid treated clays and others.

The co-promoter which is employed to promote the efficiency of the acidic oxide catalyst base is a combination of metallic nickel and an oxide of a polyvalent metal of Group VI–A. Specific examples of the co-promoters include nickel, in combination with molybdenum oxide, chromium oxide, and/or tungsten oxide. In preparing the acidic oxide catalyst base co-promoted with metallic nickel in combination with the oxides of metals of Group VI–A, conventional methods of preparation can be used. Impregnation is a common method employed for the incorporation of the promoter on the catalyst base. This procedure generally involves contacting the support with a solution of a salt or a compound which upon heating will decompose to give the desired component. The excess solution is removed and the slurry is dried and calcined to produce a "green" catalyst which is subsequently activated. Precipitation techniques can also be employed where the catalyst includes more than one component. In multi-component catalysts, many variations of this method can be used, such as gel formation and co-precipitation. In carrying out this procedure, a liquid salt solution containing the required component is used to impregnate a solid support. The slurry is then contacted with a suitable precipitating agent to provide an admixture of the desired promoter incorporated in the base material. As in the impregnation technique, the resulting slurry is dried to produce a "green" catalyst which is subsequently activated. In the activation of these catalysts, the "green" catalyst is calcined and activated in a reducing atmosphere at a temperature within the range of about 800° F.–1000° F. in a hydrogen atmosphere. In this activation step the catalyst promoters are reduced so that the metal ion is reduced to its lowest state of valency under the reducing conditions. For example, the nickel salt is reduced to provide substantially metallic nickel; whereas, for the non-reducible oxides of the transition metals of Group VI–A, such as chromium, molybdenum, and tungsten oxides, the activation in a reducing atmosphere results in a reduction of the valence of the metal ion.

The following catalyst preparation techniques are exemplary of the methods which can be employed in preparing the catalysts employed in the process of this invention:

A suitable acidic oxide base is impregnated by immersion in an aqueous solution of a decomposable, Group VI–

A metal salt, such as ammoniacal ammonium paramolybdate, ammonium chromate or ammonium tungstate. The impregnated carrier is dried and heated to temperatures sufficient to decompose the Group VI-A metal salt to the oxide. The support impregnated with the Group VI-A metal is thereafter slurried in an aqueous solution of a decomposable nickel salt, such as nickel nitrate. After drying, the resulting mass impregnated with decomposable nickel salt is heated to an elevated temperature sufficient to decompose the nickel salt to form nickel oxide. This two-step impregnation process can be alternatively carried out by first introducing into the refractory oxide catalyst base the nickel salt, and thereafter following an appropriate sequential treatment to introduce the molybdic oxide into the catalyst composition. The incorporation of the nickel and Group VI-A metal oxide promoting agent in the support can also be carried out by employing co-precipitation techniques, which involve the precipitation of a decomposable nickel compound from an aqueous solution of a nickel salt, such as nickel nitrate or nickel sulfate, by the addition of an aqueous solution of ammonium molybdate. This preparation can be carried out on a suitable oxide carrier by first impregnating the carrier by either the nickel or the Group VI-A metal salt and thereafter contacting the thus-impregnated carrier with the other salt. An aqueous impregnation solution, however, preferably containing a slight excess of ammonia, can be prepared by dissolving a water-soluble salt of nickel and a water-soluble Group VI-A metal salt in an aqueous ammoniacal solution. The carrier is then immersed in the impregnation solution which is adsorbed thereon. The impregnated oxide carrier is then dried and calcined to decompose the adsorbed metal compounds. In another suggested technique for incorporating the Group VI-A metal salt constituent in the refractory oxide carrier, the oxide catalyst is impregnated with an aqueous solution of a Group VI-A tetrachloride, and upon drying and calcining the impregnated catalyst base, a Group VI-A trioxide is formed. Thereafter the nickel constituent can be incorporated in any suitable manner such as the above-described two-stage impregnation technique. See also the various techniques suggested in U.S. Patent 2,739,133 for combining a Group VI-A metal oxide with the selected refractory oxide catalyst base. Although the foregoing catalyst preparations employ a carrier or acidic oxide catalyst base in finished form as the support, it is also to be understood that the precipitation of the metallic nickel and Group VI-A oxide co-promoters can be effected on carriers in the undried, hydrous gel form, and thereafter calcined to produce a "green" catalyst which can be subsequently activated by contacting the catalyst composition in a reducing atmosphere.

The amounts of the metallic nickel and Group VI-A metal oxide employed are of course dependent upon the respective amounts of nickel and Group VI-A metal oxide desired in the finished catalyst, as hereinafter will be considered. Because the preferred quantities are the stoichiometric amounts necessary to form theoretically nickel molybdate, nickel chromate or nickel tungstate in the "green" catalyst prior to activation, it is convenient to utilize this basis for determining the amount of co-promoter used. In other words, 1 to 15% by weight, based on dried, "green" catalyst, of co-promoter calculated as nickel molybdate, nickel chromate, and/or nickel tungstate can be used effectively. The ratios of nickel and the Group VI-A metal oxide in the final composition however, can vary. Accordingly, other than stoichiometric concentrations can be used. Therefore, on a finished activated catalyst composition basis, the nickel content (calculated as metallic nickel) should be within the range of about 1 to 5% by weight, based on total catalyst composition, with the Group VI-A metal oxide constituent present as the oxide with the metal ion being in its lowest valency state being within the range of about 1.6 to 8.2% metal, based on total catalyst composition.

The activation of the "green" catalyst compositions is carried out by subjecting the catalyst to a reducing atmosphere which is maintained at a temperature within the range of about 800° to 1000° F. In the activation of catalysts in this manner it is preferred that hydrogen be employed as the reducing agent, that hydrogen rates within the range of about 10 to 30 ft. per min. be employed, and that the reducing be carried out for a time within the range of about 10 to 30 hours. In "Catalysis I," Emmett, Reinhold 1954, at pages 329–336, there is disclosed a number of preparations which can be employed for the procedures of the refractory oxide catalyst base co-promoted with metallic nickel and the Group VI-A metal oxide combination. Although catalysts activated in the conventional manner by calcining and activating the "green" catalyst composition in a reducing atmosphere exhibit high activity and selectivity for use in the hydroisomerization process of this invention, the nickel catalyst used in the instant invention manifests an increased activity if activated in accordance with the technique described by N. L. Carr, et al., in co-pending application entitled, Process, Serial No. 694,586, filed November 5, 1957. In accordance with this process, a "green" catalyst is activated by employing hydrogen-containing activation gases which have been humidified in order to incorporate a selected amount of water vapor. In the gaseous treating system, the humidification of or addition of water to, these gases can be carried out employing conventional apparatus. Because the controlled humidification of the activation gases is an important feature of this activation technique, it is necessary that the partial pressure of water in the activation streams be controlled within narrow ranges depending upon the activation temperature. The following represents in tabular form a summary of the partial pressure conditions that should exist within the hydrogen-containing gas streams employed in the preconditioning step.

| Temperature, ° F. | Water Partial Pressure, mm. Hg, Absolute | |
|---|---|---|
| | Lower Limit | Upper Limit |
| 700 | 5 | 25 |
| 825 | 10 | 40 |
| 975 | 15 | 100 |

In activating the catalysts in this manner, the activation gases are humidified whether the activation is carried out employing a simple reduction step or whether the activation involves a sequential oxidation followed by a reducing step. To facilitate a consideration of catalysts activated in this manner, in the appended claims this type of catalyst composition will be defined as "water equilibrated."

To effect the humidification of the reaction zone in carrying out the process of this invention, water can be introduced either in admixture with the feed stock or by the separate introduction of water through a separate water feed system. According to this invention, sufficient amounts of water should be introduced so as to provide a partial pressure of water within the reaction zone within the range of about 10–50 mm. Hg. When excessive amounts of water are added, the activity of the catalyst is reduced to an impractical level and the process becomes uneconomical even though relatively high selectivities are realized.

To illustrate the instant invention a nickel-molybdenum oxide-promoted silica-alumina catalyst was prepared as follows: An ammoniacal solution of paramolybdate was prepared by dissolving 32 grams of ammonium heptamolybdate $(NH_4)_6Mo_7O_{24} \cdot 4H_2O$ in 270 milliliters of distilled water to a salt content of about 11% by weight. To this solution was added 20 ml. of concentrated ammonium hydroxide to provide an ammonia/$H_2O$ ratio of about 0.075/1. An 18 weight percent solution of nickel nitrate was prepared by dissolving 57.8 grams of $Ni(NO_3)_2 \cdot 6H_2O$, in 270 ml. of water, and the molybdenum-/and nickel-containing solutions were separately heated to about 176° F. and admixed. To this mixture was added 360 grams of silica-alumina, sufficient to yield a finished catalyst impregnated with 10% of nickel molybdate. The composition of the commercially prepared silica-alumina was:

| Component: | Weight percent |
|---|---|
| $Al_2O_3$ | 23.12 |
| $Na_2O$ | 0.02 |
| Fe | 0.02 |
| $SO_4$ | 0.25 |
| $SiO_2$ | 76.59 |

The resulting slurry was mixed for one hour at 176° F. and then was filtered, washed with water, and dried for 16 hours in an oven at 230° F. to provide a "green" composite containing 10% $NiMoO_4$ on the silica-alumina support. To initially activate the catalyst, 176 grams of "green" catalyst were inserted in a reactor and heated rapidly to 400° F. with 10 s.c.f.h. hydrogen flowing through the reactor. The temperature of the catalyst was raised at a rate of 100° F. per hour to 975° F., employing a hydrogen rate of 10 s.c.f.h. This hydrogen rate and the temperature were maintained for one hour, after which the hydrogen rate was reduced to 4 s.c.f.h. and held for 18 hours at 975° F., i.e., until no ammonia is detected in the off-gas. The catalyst was then cooled to 800° F. with the same hydrogen rate, and purged with nitrogen to remove the hydrogen from the reactor. A dry air and nitrogen mixture (1 part of air/3 parts of nitrogen by volume) was passed through the reactor at a rate of 3 s.c.f.h. to effect the oxidation of the oxidizable constituents of the catalyst composition. The temperature of the catalyst bed was maintained at about 700° F. and the maximum temperature attained during this preliminary oxidation step was 750° F. This low-temperature oxidation was carried out for one-half hour; thereafter, air was introduced into the reactor at the rate of 4 s.c.f.h. and the catalyst bed heated to 975° F. This condition was held for one hour. The reactor was then purged thoroughly with nitrogen and hydrogen, dried and purified to provide a reducing stream consisting of not less than 99 mol percent hydrogen, was passed into the reactor or catalyst bed at 975° F. and atmospheric pressure at the rate of 4 s.c.f.h. for 35 minutes to effect the reduction of the reducible constituents of the catalysts, whereby the nickel was reduced to the metallic nickel state and the molybdenum oxide was reduced to the lowest state of valency at these conditions. The reactor was purged with hydrogen at the rate of 1 s.c.f.h. for 20 hours with the catalyst bed being maintained at 975° F.

The hydrogen rate was then increased to 4 s.c.f.h. and moisture in the form of $H_2O$ was added to the feed hydrogen at a partial pressure of 22 mm. Hg. The temperature of the catalyst bed was held at 975° F. and the reduction was carried out for 20 hours. Thereafter, the temperature was lowered to 800° F. and this condition was held for three hours. The hydrogen flow was then stopped and the catalyst unit was made ready for processing.

The catalyst was then put on stream employing a feedstock consisting essentially of n-pentane. In Run A, a temperature of 700° F. and a pressure of 500 p.s.i.g., with a liquid volume hourly space velocity of 3 and hydrogen-to-hydrocarbon mol ratio of 1, was employed. At these conditions, within 40 minutes hydrocracking became excessive and hot spots developed in the reaction zone making the process inoperable. Efforts were made to mitigate the hydrocracking occurring during the isomerization reaction by using combinations of higher and lower partial pressures of both hydrogen and hydrocarbon. These conditions did not substantially reduce the hydrocracking reaction rate.

Water was then added to feed stock in Run B to maintain a water vapor partial pressure of about 14 mm. Hg in the reactor. This water vapor eliminated the hot spots, and normal operation was resumed and continued until the reaction was voluntarily stopped after about two hours of smooth operation.

In a check run, the reactor was placed in a standby condition, after which Run C, at 500 p.s.i.g. and 700° F. was conducted, using the same feedstock and with the same water-partial pressure as in Run B. Operation continued to be smooth and without hot spots. The catalyst then was regenerated employing conventional oxidation-reduction techniques and Run D was conducted, again using the same feedstock and operating conditions as in Runs B and C, except that the water partial pressure was increased to between about 15–20 mm. Hg. Operation was again smooth, and higher selectivity was attained as a result of the regeneration. Following Run D, and without interrupting operation, water partial pressure in Run E was increased to 100 mm. Hg. Under this condition of excess water partial pressure, the conversion decreased quickly.

The results of these experimental investigations are tabulated in Table I:

*Table I*

EFFECT OF WATER IN ISOMERIZATION FEEDSTOCK

| Run | A | B | C | D [2] | E |
|---|---|---|---|---|---|
| Operating Conditions: | | | | | |
| LVHSV (v./hr./v.) | 3 | 3 | 3 | 3 | 3. |
| $H_2$/HC mol ratio | 1 | 1 | 1 | 1.15 | 2. |
| Temp. (° F.) | 700 | 700 | 700 | 700 | 700. |
| Press. (p.s.i.g.) | 500 | 500 | 500 | 500 | 500. |
| Part. Press. $H_2O$ in reactor (mm. Hg) | 0 | 14 | 14 | 17–20 | 100. |
| Results: | | | | | |
| Conversion, percent | 37.2 [1] | Not determined | 36.1 | 36.1 | 13.3. |
| Yield, percent | 27.1 | do | 27.2 | 31.3 | 11.7. |
| Selectivity, percent | 73 | do | 75.3 | 86.8 | 88.0. |
| Remarks | Hot spots developed at 40 minutes. | Hot spots eliminated. Operation smooth. | Oper. smooth. | Oper. smooth. | Oper. smooth. |

[1] These results were obtained before the hydrocracking rate became so high as to necessitate stopping the feed.
[2] The catalyst employed in run C was regenerated employing a conventional oxidation-reduction technique prior to reuse in run D.

Several other runs were conducted employing catalyst compositions consisting essentially of an acidic oxide catalyst base promoted with small amounts of metallic nickel (Run F), and another catalyst composition consisting essentially of an acidic oxide catalyst co-promoted with metallic nickel and aluminum phosphate (Run G). These runs were carried out employing the same feedstock and same operating conditions. It was found from Runs F and G that the addition of various amounts of water to produce a partial pressure due to water in the reaction zone had no effect in mitigating the hydro-cracking tendencies of these catalysts. These results are summarized in Table II.

Table II

RUN F
[3% Ni on 87/13 silica/alumina; pressure, 500 p.s.i.g.; n-pentane feed.]

| | | | | |
|---|---|---|---|---|
| LVHSV | 2.5 | 2.4 | 2.4 | 2.4 |
| Temp., °F | 718 | 720 | 720 | 720 |
| $H_2/HC$ | 1.1 | 1.1 | 1.0 | 1.0 |
| $H_2O$ part. pres., mm. Hg | dry | 25 | 45 | 58 |
| Hours on-stream | 0-2 | 4-14 | 30-40 | 44-52 |
| n-$C_5$ Conv., percent | 55.2 | 56.2 | 54.0 | 51.6 |
| i-$C_5$ Yield, Percent | 47.7 | 46.8 | 46.1 | 44.7 |
| Selectivity, Percent | 86.4 | 83.5 | 85.2 | 86.7 |

RUN G
[5% Ni on 75/25 silica/alumina with 10% $AlPO_4$; pressure, 500 p.s.i.g.; n-pentane feed.]

| | | |
|---|---|---|
| LVHSV | 1.0 | 1.0 |
| Temp., °F | 675 | 675 |
| $H_2/HC$ | 2.1 | 2.1 |
| $H_2O$ part. pres., mm. Hg | dry | 25 |
| Hours on-stream | 18-30 | 38-54 |
| n-$C_5$ Conv., Percent | 19.5 | 20.5 |
| i-$C_5$ Yield, Percent | 17.0 | 17.6 |
| Selectivity, Percent | 87 | 86 |

In another series of runs to investigate the effect of water on selectivity and conversion, a catalyst having the same composition as the one employed in the foregoing runs was subjected to an extended period of operation under the conditions shown in the tabular summary in Table III.

Table III
EFFECT OF TRACE WATER IN PROCESSING
[Reaction pressure:500 p.s.i.g. Feed: n-pentane.]

| Cut No | 1 | 3 | 5 | 9 | 12 | 15 | 19 | 23 | 27 | 38 | 42 | 50 | 55 |
|---|---|---|---|---|---|---|---|---|---|---|---|---|---|
| LVHSV | 2.8 | 3.0 | 1.0 | 1.0 | 1.0 | 1.0 | 1.0 | 1.0 | 1.0 | 1.0 | 1.0 | 1.0 | 1.0 |
| Reactor Temp., °F | 693 | 694 | 696 | 680 | 678 | 678 | 680 | 680 | 680 | 680 | 680 | 680 | 680 |
| $H_2/HC$ | 1 | 1 | 1 | 2.1 | 2.2 | 2.1 | 2.2 | 2.1 | 2.1 | 2.1 | 2.2 | 2.1 | 2.2 |
| Partial Pressure $H_2O$ in Reactor, mm. Hg | 17 | 17 | 17 | Dry | Dry | Dry | 25 | 25 | 25 | 25 | 25 | 25 | 25 |
| Hours since regen | 2 | 6 | 10 | 18 | 24 | 30 | 38 | 46 | 54 | 76 | 84 | 100 | 110 |
| Conversion, percent | 23.0 | 24.3 | 24.5 | 23.2 | 26.5 | 28.2 | 27.2 | 26.1 | 24.9 | 24.6 | 22.3 | 26.1 | 23.6 |
| Yield, Percent | 20.9 | 22.5 | 22.2 | 20.6 | 21.6 | 22.0 | 22.2 | 22.2 | 21.5 | 21.3 | 19.9 | 23.1 | 21.2 |
| Selectivity, Percent | 90.9 | 92.7 | 90.6 | 88.7 | 81.5 | 78.1 | 81.6 | 85.2 | 86.3 | 86.4 | 89.3 | 88.4 | 89.8 |

It can be seen from this data that operation at 17 mm. Hg water partial pressure maintained conversion and selectivity substantially constant (cuts 1–5). However, when water addition was terminated, selectivity decreased rapidly (cuts 9–15) but when water was re-introduced at a partial pressure of 25 mm. Hg (cuts 19–55), selectivity gradually improved to about its original level.

Although the foregoing invention is illustrated by the use of a silica-alumina catalyst co-promoted with metallic nickel and molybdenum oxide, it is apparent that a number of variations and modifications can be made without departing from the scope of the instant invention. A variety of feed stocks can be employed which consist predominantly of isomerizable saturated hydrocarbons having 4–7 carbon atoms per molecule employing operating conditions which are especially adaptable for the respective constituents of the feed stock. The feed stock can consist of either pure hydrocarbons or mixture of such, or it can consist of naturally-occurring mixtures of hydrocarbons, such as natural gasolines or low-boiling distillates having a boiling range of about 85° to 250° F., fractionated from a full-boiling-range straight-run gasoline. It may be preferred to process stocks of narrower boiling range. Thus a typical $C_5$–$C_6$ natural gasoline used in this processing contained around 38 percent pentanes, 48 percent hexanes, 4 percent benzene, and 9 percent $C_6$-naphthenes. Similarly, a $C_7$ fraction of the same naphtha, depending upon precision of fractionation, will contain a mixture of $C_6$ and $C_7$ hydrocarbons. A typical stock showed the following approximate composition: Hexanes and lighter, 7 percent; benzene, 2 percent; heptanes, 63 percent; $C_6$-naphthenes, 19 percent; and $C_7$-naphthenes, 9 percent by weight. Because of the relatively mild conditions employed, any naphthenes which are contained in the feed stock are not dehydrogenated, but can be isomerized. For example, cyclohexane is isomerized to methycyclopentane instead of being converted to benzene by dehydrogenation. Cyclohexane is also hydroisomerized to the paraffinic hexanes.

In addition, as pointed out above, a variety of solid, refractory oxide hydrocarbon cracking catalysts can be employed to support the co-promoter consisting of metallic nickel and the Group VI-A metal oxide where in the latter constituent the metal ion is reduced to its lowest state of valency obtainable under the reducing conditions employed in the catalyst preparation. Accordingly, it is intended that the subject invention be limited only in the manner as set forth in the following claims.

We claim as our invention:

1. In a hydroisomerization process wherein an isomerizable saturated hydrocarbon having 4–7 carbon atoms per molecule is isomerized at temperatures within the range of about 600° to 750° F. in the substantial absence of hydrocracking under isomerizing conditions of pressure and $H_2$/hydrocarbon mol ratio in the presence of a catalyst consisting essentially of a solid, refractory oxide composited to evince acidic properties, and having hydrocarbon cracking activity, co-promoted with small amounts of metallic nickel and an oxide of a metal of Group VI-A, the improvement which comprises carrying out the hydroisomerization process in the presence of added amounts of water sufficient to mitigate the hydrocracking tendencies of said catalyst.

2. A process in accordance with claim 1 in which sufficient amounts of water are introduced into the reaction zone to provide a water partial pressure within the range of about 10–50 mm. Hg.

3. In a hydroisomerization process wherein a isomerizable saturated hydrocarbon having 4–7 carbon atoms per molecule is isomerized at temperatures within the range of about 600 to 750° F. in the substantial absence of hydrocracking under isomerization conditions of pressure and $H_2$/hydrocarbon mol ratio in the presence of a catalyst consisting essentially of a solid, refractory oxide catalyst, composited to evince acidic properties and hydrocarbon cracking activity, co-promoted with small amounts of metallic nickel and molybdenum oxide, the improvement which comprises carrying out the hydroisomerization process in the presence of added amounts of water sufficient to mitigate the hydrocracking tendencies of said catalyst.

4. A process in accordance with claim 3 in which sufficient amounts of water are introduced into the reaction zone to provide a water partial pressure within the range of about 10–50 mm. Hg.

5. In a hydroisomerization process wherein a saturated hydrocarbon having 4 to 7 carbon atoms per molecule is isomerized in a reaction zone at a temperature within the range of about 600° to 750° F., in the substantial absence of hydrocracking, a pressure within the range of about 100 to 1000 p.s.i.g., and a hydrogen/hydrocarbon mol ratio within the range of about 0.5 to 4.5, in the presence of a catalyst consisting essentially of a major portion of a silica-alumina hydrocarbon cracking catalyst co-promoted with small amounts of metallic nickel and molybdenum oxide, the improvement which comprises carrying out the hydroisomerization in the presence of added amounts of water sufficient to mitigate the hydrocracking tendencies of said catalysts.

6. A process in accordance with claim 5 in which sufficient amounts of water are introduced into said reaction zone to increase the water partial pressure within the reaction zone to about 10–50 mm. Hg.

7. In a hydroisomerization process wherein a saturated isomerizable hydrocarbon having 4 to 7 carbon atoms per molecule is isomerized in a reaction zone at a temperature within the range of about 600° to 750° F., in the substantial absence of hydrocracking, a pressure within the range of about 100 to 1000 p.s.i.g., and a hydrogen/hydrocarbon mol ratio within the range of about 0.5 to 4.5, in the presence of a catalyst consisting essentially of a major portion of a silica-alumina hydrocarbon cracking catalyst co-promoted with small amounts of metallic nickel and molybdenum oxide (calculated as $MoO_2$), the mol ratio of nickel to molybdenum oxide within the range of about 0.5 to 2.0, the improvement which comprises carrying out the hydroisomerization in the presence of added amounts of water sufficient to mitigate the hydrocarbon cracking tendencies of said catalyst.

8. A hydroisomerization process in accordance with claim 6 in which sufficient amounts of water are introduced into said reaction zone to provide a water partial pressure within the range of about 10–50 mm. Hg.

9. In the hydroisomerization process wherein normal pentane is isomerized at a temperature of about 700° F., a pressure of about 500 p.s.i.g. and a hydrogen/hydrocarbon mol ratio of about 1–3 in the presence of a catalyst consisting essentially of a major portion of a silica-alumina hydrocarbon cracking catalyst co-promoted with small amounts of metallic nickel and molybdenum oxide, the amounts of nickel and molybdenum oxide based on the dried, "green" catalyst having incorporated therein 10–15% of nickel molybdate, the improvement which comprises carrying out the hydroisomerization in the presence of 10–50 mm. Hg of water vapor.

References Cited in the file of this patent

UNITED STATES PATENTS

| 2,642,384 | Cox | June 16, 1953 |
| 2,718,535 | McKinley et al. | Sept. 20, 1955 |

FOREIGN PATENTS

| 487,392 | Canada | Oct. 21, 1952 |

UNITED STATES PATENT OFFICE

CERTIFICATE OF CORRECTION

Patent No. 2,918,510                      December 22, 1959

Norman L. Carr et al.

It is hereby certified that error appears in the printed specification of the above numbered patent requiring correction and that the said Letters Patent should read as corrected below.

Column 1, lines 71 and 72, after "molybdenum" insert -- oxide --; column 4, line 13, for "preparations" read -- procedures --; line 14, for "procedures" read -- preparation--

Signed and sealed this 28th day of June 1960.

(SEAL)
Attest:

KARL H. AXLINE
Attesting Officer

ROBERT C. WATSON
Commissioner of Patents